3,579,504
DERIVATIVE OF Δ⁴,⁹-GONADIENE AND
PROCESS OF PREPARATION
Gerard Nominé, Noisy-le-Sec, Robert Bucourt, Clichy-sous-Bois, and André Pierdet, Noisy-le-Sec, France, assignors to Roussel-UCLAF, S.A., Paris, France
No Drawing. Continuation-in-part of application Ser. No. 282,587, May 23, 1963. This application Apr. 26, 1965, Ser. No. 451,051
Int. Cl. C07c 173/00
U.S. Cl. 260—239.55
8 Claims

ABSTRACT OF THE DISCLOSURE

The present invention relates to a new derivative of Δ⁴,⁹-gonadiene of Formula I;

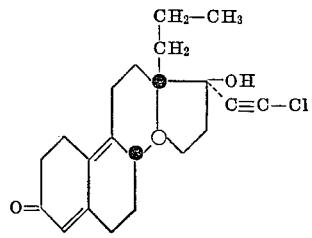

(I)

as well as a process of preparation of the said compound. The invention also relates to intermediates useful in the production of the compound of Formula I.

REFERENCE TO A PRIOR APPLICATION

This application is a continuation-in-part of our co-pending U.S. patent application Ser. No. 282,587, filed May 23, 1963 and now abandoned.

13β-n-propyl - 17α - chloroethynyl-Δ⁴,⁹-gonadiene-17β-ol-3-one possesses useful physiological properties and is particularly endowed with an anabolic activity and an inhibitory activity against gonadotrophine. It is more active than 17α-ethynyl-10-nor testosterone and, moreover, is deprived of estrogenic activity. In addition, the compound of the invention possesses an important anticholesterol activity.

The invention has as its object the production of 13β-n-propyl-17α-chloroethynyl-Δ⁴,⁹-gonadiene-17β-ol-3-one.

The invention also has for its object the development of a process for the production of 13β - n - propyl-17α-chloroethynyl-Δ⁴,⁹-gonadiene-17β-ol - 3 - one which comprises the steps of reacting chloroethynyl lithium with a compound of the formula

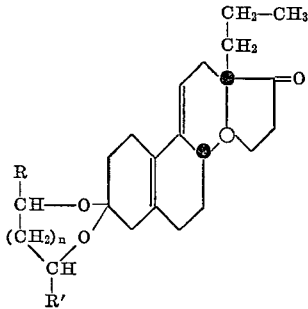

wherein R and R' are members selected from the group consisting of hydrogen and lower alkyl and n is an integer from 0 to 1 in the presence of an inert organic solvent, subjecting the chloroethynyl compound of the formula

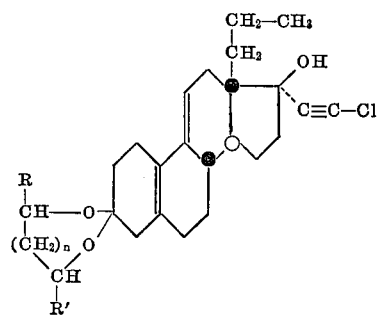

wherein R, R' and n have the above assigned values, to an acid hydrolysis, and recovering said 13β-n-propyl-17α-chloroethynyl-Δ⁴,⁹-gonadiene-17β-ol-3-one.

A still further object of the invention is the production, as intermediates, of a compound of the formula

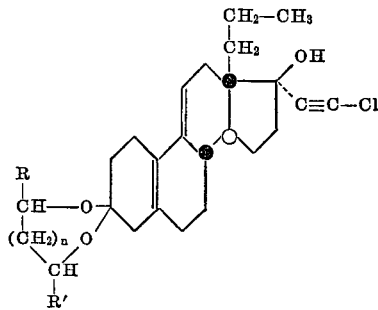

wherein R and R' are members selected from the group consisting of hydrogen and lower alkyl and n is an integer from 0 to 1, and particularly 3 - ethylenedioxy-13β-n-propyl-17α-chloroethynyl-Δ⁵⁽¹⁰⁾,⁹⁽¹¹⁾-gonadiene-17β-ol.

These and other objects of the invention will become more apparent as the description thereof proceeds.

The process, which has been outlined above, in the objects of the invention, is shown by the flow diagram of Table I.

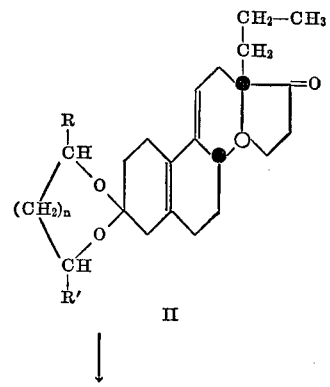

II

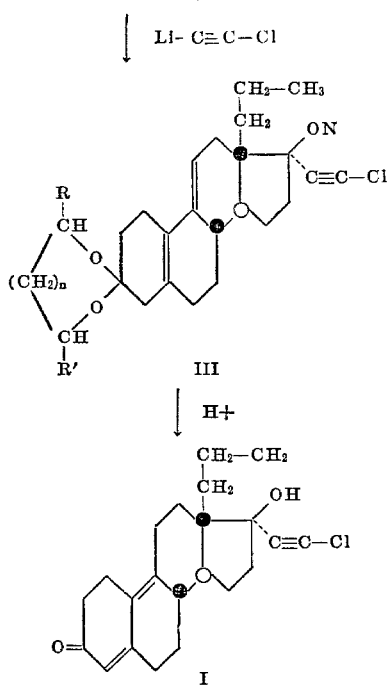

R and R' equal hydrogen or lower alkyl n equals 0 or 1

The process of the invention, the preparation of 13β-n-propyl - 17α - chloroethynyl-Δ⁴,⁹-gonadiene-17β-ol-3-one of Formula I is comprised essentially in that chloroethynyl lithium is reacted with a 13β-n-propyl gonadiene of the Formula II:

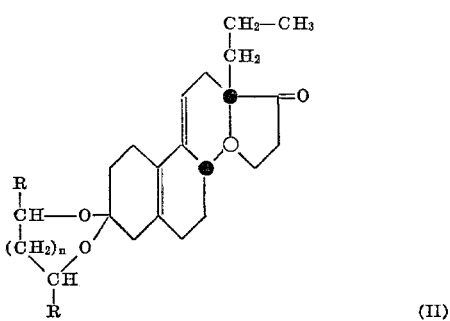

in which R and R' represent hydrogen or a lower alkyl radical and n designates the number 0 or 1 in the presence of an inert organic solvent, then the resulting 17α-chloroethynylated derivative III is subjected to acid hydrolysis, and the desired 13β-n-propyl-17α-chloroethynyl-Δ⁴,⁹-gonadiene-17β-ol-3-one is recovered by conventional means.

The action of chloroethynyl lithium in the chloroethynylation step is completely unexpected in view of the steric hindrance caused by the presence of the propyl group in the 13 position.

The chloroethynylation reactant can be advantageously prepared in situ by the action of cisdichloroethylene on methyl lithium, the reaction being conducted in an inert organic solvent such as ether.

The chloroethynylation reaction itself is likewise conducted in an inert organic solvent, which can be the same as the solvent employed in the preparation of the chloroethynyl lithium. The reaction occurs at ordinary temperatures although elevated or lowered temperatures may be employed.

The acid hydrolysis of the ketal of the 17α-chloroethynylated derivative III is easily realized by the action of a strong mineral acid such as perchloric acid in an organic carboxylic acid such as acetic acid.

The starting compounds of Formula II can be obtained, for example, according to the method described in the United States patent application Ser. No. 204,057, filed June 21, 1962, commonly assigned, now U.S. Pat. No. 3,444,297. However, the preparation of 3-ethylenedioxy-13β-n-propyl-Δ⁵(¹⁰),⁹(¹¹)-gonadiene-17-one is described in Example I, given as illustration only.

By the term "gonane" and its variations, such as "gonadiene" etc., we mean a compound having a saturated cyclopentanophenanthrene nucleus and having the steric configuration of the natural steroids. The compounds so named could also be called 18,19-di-nor-androstanes.

The following examples are illustrative of the invention. They are not, however, to be construed as limitative. It is obvious that other expedients known to those skilled in the art may be employed.

EXAMPLE I

Preparation of 3-ethylenedioxy-13β-n-propyl-Δ⁵(¹⁰),⁹(¹¹)-gonadiene-17-one (II, R=R'=H, n=0)

Step A: Ketalization of 13β-n-propyl-17β-benzoyloxy-Δ⁴,⁹-gonadiene-3-one.—2 gm. of 13β-n-propyl-17β-benzoyloxy-Δ⁴,⁹-gonadiene-3-one, having a melting point of 166° C. and a specific rotation $[\alpha]_D^{20}=-108.5°$ (methanol) (obtained according to Velluz et al. Tetrahedron Letters No. 3, March 1961, pp. 127–130), were introduced into 40 cc. of methylethyl dioxolane and 40 mg. of p-toluene sulfonic acid. The reaction mixture was heated to reflux temperature for a period of two hours. After cooling, the mixture was poured into a dilute solution of sodium bicarbonate. The aqueous mixture was extracted with ether. The extracts were combined and evaporated to dryness. A residue comprising 3-ethylenedioxy-13β-n-propy 1- 17β - benzoyloxy - Δ⁵(¹⁰),⁹(¹¹) - gonadiene was obtained, which was used as such for the next step of the synthesis.

Step B: Saponification of 3-ethylenedioxy-13β-n-propyl-17β-benzoyloxy-Δ⁵(¹⁰),⁹(¹¹)-gonadiene.—2.29 gm. of 3-ethylenedioxy - 13β-n-propyl-17β-benzoyloxy-Δ⁵(¹⁰),⁹(¹¹)-gonadiene, obtained according to the preceding step, were dissolved in a mixture of 42 cc. of methanol and 11 cc. of a 10% solution of potassium hydroxide in methanol. The reaction mixture was heated to reflux under a nitrogen atmosphere for a period of three hours and forty-five minutes. Next, the reaction mixture was concentrated to a small volume, poured into water, and extracted with ether. The ethereal extracts were combined, washed with water, dried and evaporated to dryness under vacuum. The residue was subjected to chromatography through silica gel which supplied 3 - ethylenedioxy - 13β-n-propyl-Δ⁵(¹⁰),⁹(¹¹)-gonadiene-17β-ol.

Step C: Oxidation of 3-ethylenedioxy-13β-n-propyl-Δ⁵(¹⁰),⁹(¹¹)-gonadiene-17β-ol.—1.5 gm. of 3-ethylenedioxy-13β-n-propyl-Δ⁵(¹⁰),⁹(¹¹)-gonadiene-17β - ol obtained according to the preceding step, were introduced into a mixture of 25 cc. of cyclohexanone and 200 cc. of anhydrous toluene. The mixture was heated to boiling and over a space of two and a half hours, 1.26 gm. of aluminum isopropylate in solution in 115 cc. of anhydrous toluene were added. The heating at reflux was continued for a period of a further half hour. The reaction mixture was then cooled and a solution of 4.5 gm. of potassium carbonate and 9 gm. of mixed sodium-potassium tartrate in 90 cc. of water were added. The mixture formed was subjected to a steam distillation for a period of two hours. After cooling, the residue was extracted with ether. The ethereal extracts were washed with water and evaporated to dryness under vacuum.

The residue was subjected to chromatography through silica gel and eluted with methylene chloride. 3-ethylenedioxy - 13β - n - propyl - Δ⁵(¹⁰),⁹(¹¹)-gonadiene-17-one was obtained, which was used as such in the next example. This compound corresponds to Formula II where

R=R'=H and n=0.

In place of the utilization of methylethyl dioxolane in the ketalization step, other ketal-forming compounds may be employed such as ethylene glycol, propylene glycol, butylene-2,3-diol, butylene-1,3-diol, etc., as well as cyclic derivatives of these compounds such as the dioxolanes.

EXAMPLE II

Preparation of 13β-n-propyl-17α-chloroethynyl-Δ$^{4,9}$-gonadiene-17β-ol-3-one, I Step A: 3 - ethylenedioxy - 13β - n-propyl-17α-chloroethynyl - Δ$^{5(10),9(11)}$ - gonadiene - 17β-ol (III, R=R'=H, n=0).—A mixture of 12 cc. of a 2.6 N solution of methyl lithium in ether and 100 cc. of ether was placed on an ice bath. A solution of 6 cc. of cis-dichloroethylene in 40 cc. of ether was added slowly thereto. The mixture was then agitated under an atmosphere of nitrogen at room temperature for a period of one hour and thirty minutes.

Next, 365 mg. of 3 - ethylenedioxy - 13β - n - propyl-Δ$^{5(10),9(11)}$-gonadiene-17-one (II, R=R'=H, n=0), prepared according to Example I, dissolved in 30 cc. of ether were introduced and the reaction mixture was allowed to stand overnight at room temperature. The reaction mixture was then poured on a mixture of water and ice. The aqueous phase was decanted and extracted with isopropyl ether. The organic phase was combined with the extracts which were washed with water, dried and evaporated to dryness under vacuum. 415 mg. of product were obtained which by subjecting to chromatograph through magnesium silicate and elution with methylene chloride supplied 277 mg. of raw 3 - ethylenedioxy - 13β-n-propyl-17α-chloroethynyl-Δ$^{5(10),9(11)}$-goadiene-17β-ol, III, R=R'=H, n=0. which were utilized as such in the following stage (yield =64%).

U.V. Spectra (ethyl alcohol):

$$\lambda max. \ 236 \ m\mu \ E^{1\%}_{1cm.} = 454$$

$$\lambda max. \ 243 \ m\mu \ E^{1\%}_{1cm.} = 478$$

$$inflex. \ 251 \ m\mu \ E^{1\%}_{1cm.} = 313$$

I.R. Spectra (in chloroform):

17-one less than 1%
Absence of conjugated ketone
Presence of a hydroxyl band at 3,600 cm.[1]
Presence of a chloroethynyl (—C≡C—Cl) band toward 2,220 cm.[-1]

This compound is not described in the literature.

Step B: 13β-n-propyl-17α-chloroethynyl-Δ$^{4,9}$-gonadiene-17β-ol-3-one, I.—277 mg. of 3 - ethylenedioxy - 13β - n-propyl - 17α - chloroethynyl-Δ$^{5(10),9(11)}$-gonadiene-17β-ol, (III, R=R'=H, n=0), where introduced into a mixture of 7.7 cc. of acetic acid and 0.85 cc. of 55° Be perchloric acid. The reaction mixture was allowed to stand under an atmosphere of nitrogen for a period of thirty minutes at room temperature. Then it was poured into water. The aqueous mixture was extracted with methylene chloride. The extracts were washed with sodium bicarbonate and water. After washing, the extracts were dried and concentrated to dryness under vacuum. After subjecting the residue to chromatography through magnesium silicate and crystallization from a mixture of methanol and isopropyl ether, 112 mg. of 13β-n-propyl-17α-chloroethynyl-Δ$^{4,9}$-gonadiene-17β-ol-3-one, I were obtained having a melting point of 174–175° C.

The product occurred in the form of white prisms insoluble in water and dilute aqueous acids and alkalis, and soluble in alcohol, ether, acetone, benzene and chloroform.

*Analysis.* — $C_{22}H_{26}O_2Cl$: molecular weight=358.89. Calculated (percent): C, 73.62; H, 7.58; Cl, 9.87. Found percent): C, 73.5; H, 7.5; Cl, 10.2.

Specific rotation: $[\alpha]_D^{20} = -314.7°$ (c.=0.5% in methanol).

U.V. Spectra (ethyl alcohol):

$$\lambda max. \ 304 \ m\mu \ E^{1\%}_{1cm.} = 576 \ \epsilon 20,700$$

$$inflex. \ 235 \ m\mu \ E^{1\%}_{1cm.} = 132$$

I.R. Spectra (in chloroform):

Absence of 17-one group
Presence of hydroxyl band at 3,600 cm.[-1]
Presence of chloroethynyl (—C≡C—Cl) band toward 2,220 cm.[-1]
Presence of C=O band at 1,650 cm.[-1]
Presence of C=C band at 1,605 cm.[-1]
Shoulder at about 1,587 cm.[-1].

This product is not described in the literature.

EXAMPLE III

Pharmacological study of 13β-n-propyl-17α-choloethynyl-Δ$^{4,9}$-gonadiene-17β-ol-3-one Hypocholesterolemiant action in the normal female rat.—The test was conducted on groups of female rats having an average weight of 200 gm. The compound under study was administered orally in aqueous suspension at a dose of 1 mg./kg. in the first test, and at doses of 2 and 5 mg./kg. in the second test for a period of 10 days. One group of rats of the same age and weight served as control in each test. Samples of blood were taken on the 11th day in order to determine the amount of the seric sterols. The animals were sacrificed on the same day. The following organs: the uterus, suprarenals and liver were removed and weighed.

Table II summarizes the results obtained in the first test.

TABLE II

| Groups | Dose, mg./kg. | Seric sterols, g. per liter | Uterus, mg. | Suprarenals, mg. | Liver, g./100 g. of animal | Hepatic sterols, g./1,000 g. of liver | Ratio of body weight from starting weight, percent |
|---|---|---|---|---|---|---|---|
| Control | 0 | 0.68 | 416 | 48.1 | 3.94 | 2.31 | +8 |
| 13β-n-propyl-17—chloroethynyl-Δ$^{4,9}$-gonadiene-17β-ol-3-one | 1 | 0.56 (−18%) | 423 (+2%) | 51.2 | 3.93 | 2.40 (+4%) | +4 |

It can be noted at 13β-n-propyl-17α-chloroethynyl-Δ$^{4,9}$-gonadiene-17β-ol-3-one decreased the ratio of the seric sterols at the minimum dose of 1 mg./kg., which dose is practically without any action on the uterus, the suprarenals and the liver and which causes only a slight increase in the value of the hepatic sterols.

Table III summarizes the results obtained in the second test.

TABLE III

| Groups | Dose, mg./kg. | Seric sterols, g. per liter | Uterus, mg. | Suprarenals, mg. | Liver, g./100 g. of animal | Ratio of body weight from starting weight, percent |
|---|---|---|---|---|---|---|
| Control | 0 | 0.65 | 482 | 67.7 | 4.04 | +9 |
| 13β-n-propyl-17α-chloroethynyl-Δ$^{4,9}$-gonadiene-17β-ol-3-one | 2 | 0.35 (−46%) | 406 (−16%) | 64.1 (−5%) | 4.03 | +1 |
|  | 5 | 0.25 (−62%) | 426 (−12%) | 63.3 (−6%) | 4.35 | 0 |

From the second test it can be observed that 13β-n-propyl-17α - chloroethynyl - Δ$^{4,9}$-gonadiene - 17β - ol-3-one has a considerable hypocholesterolemiant action and is practically deprived of estrogenic activity and is without action on the liver and on the suprarenals.

It is to be understood that the invention is not limited to the specific embodiments. Other expedients known to those skilled in the art may be employed without departing from the spirit of the invention and the scope of the appended claims.

We claim:
1. A compound of the formula

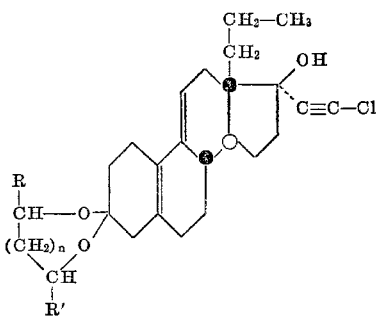

wherein R and R' are members selected from the group consisting of hydrogen and lower alkyl and $n$ is an integer from 0 to 1.

2. 3-ethylenedioxy - 13β - n - propyl - 17α-chloroethynyl-$\Delta^{5(10),9(11)}$-gonadiene-17β-ol.

3. A process for the production of 13β-n-propyl-17α-chloroethynyl-$\Delta^{4,9}$-gonadiene - 17β - ol - one which comprises the steps of reacting chloroethynyl lithium with a compound of the formula

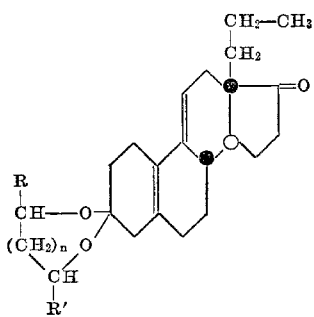

wherein R and R' are members selected from the group consisting of hydrogen and lower alkyl and $n$ is an integer from 0 to 1 in the presence of an inert organic solvent, subjecting the chloroethynyl compound of the formula

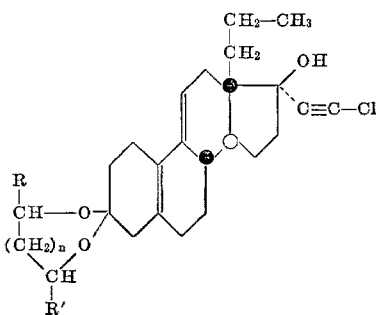

wherein R, R' and $n$ have the above assigned values, to an acid hydrolysis, and recovering said 13β-n-propyl-17α-chloroethynyl-$\Delta^{4,9}$-gonadiene-17β-ol-3-one.

4. The process of claim 3 wherein said chloroethynyl lithium is prepared in situ by reacting cis-dichloroethylene and methyl lithium in an inert organic solvent.

5. The process of claim 4 wherein said solvent is ether.

6. The process of claim 3 wherein said acid hydrolysis is brought about by the action of a strong mineral acid in an organic carboxylic acid.

7. The process of claim 3, wherein said acid hydrolysis is effected in an acetic acid media and in the presence of a small amount of perchloric acid.

8. A process for the production of 13β-n-propyl-17α-chloroethynyl - $\Delta^{4,9}$-gonadiene-17β-ol-3-one which comprises the steps of reacting chloroethynyl lithium with 3-ethylenedioxy - 13β - n - propyl-$\Delta^{5(10),9(11)}$-gonadiene-17-one in the presence of an inert organic solvent, hydrolyzing the 3 - ethylenedioxy - 13β - n - propyl-17α-chloroethynyl-$\Delta^{5(10),9(11)}$-gonadiene-17β-ol by the action of a strong mineral acid in an organic carboxylic acid, and recovering said 13β-n-propyl-17α - chloroethynyl - $\Delta^{4,9}$-gonadiene-17β-ol-3-one.

References Cited
UNITED STATES PATENTS 2,843,609    7/1958    Colton            260—397.5

HENRY A. FRENCH, Primary Examiner

U.S. Cl. X.R.

260—397.4; 424—243